United States Patent [19]
Fiecchi

[11] 3,893,999
[45] July 8, 1975

[54] SALT OF S-ADENOSIL-L-METHIONINE AND PROCESS OF PREPARATION
[75] Inventor: Alberto Fiecchi, Milan, Italy
[73] Assignee: Bioresearch S.a.s., Milan, Italy
[22] Filed: July 17, 1973
[21] Appl. No.: 380,097

[30] Foreign Application Priority Data
Aug. 2, 1972 Italy.................................. 27793/72

[52] U.S. Cl........................... 260/211.5 R; 424/180
[51] Int. Cl............................................ C07d 51/54
[58] Field of Search............................ 260/211.5 R

[56] References Cited
UNITED STATES PATENTS
2,946,781  7/1960  Shunk et al.................. 260/211.5 R
3,642,772  2/1972  Haid et al.................... 260/211.5 R Primary Examiner—Johnnie R. Brown
Attorney, Agent, or Firm—Stevens, Davis, Miller & Mosher

[57] ABSTRACT

The invention relates to the tri-p-toluensulphonate of S-adenosil-L-methionine, to the process for its preparation by addition of p-toluensulphonic acid in critical proportion to an aqueous solution containing S-adenosil-L-methionine, as well as to pharmaceutical compositions containing the new salt as the active principle, for use in numerous fields in humar therapy. The salt is an active ingredient in therapeutic compositions useful in the treatment of morbic affections wherein the metabolism of the lipids, of the glucids, of the protids, or of the catecholamines or of the biogene amines is primitively or secondarily altered.

18 Claims, No Drawings

SALT OF S-ADENOSIL-L-METHIONINE AND PROCESS OF PREPARATION

This invention relates to a new enzymatic salt, the process for its preparation and the therapeutic compositions which contain it. More precisely this invention relates to a new extremely stable salt of S-Adenosil-L-Methionine (SAM), to a process which enables it to be prepared simply and economically on an industrial scale and to new pharmaceutical compositions which contain it as the active principle, for use in numerous fields in human therapy.

SAM is notably a product of natural origin, found in all living organism from bacteria to plants, from single cell organisms to superior mammals including man, the structure of which has been known for some time and is identified by the following formula:

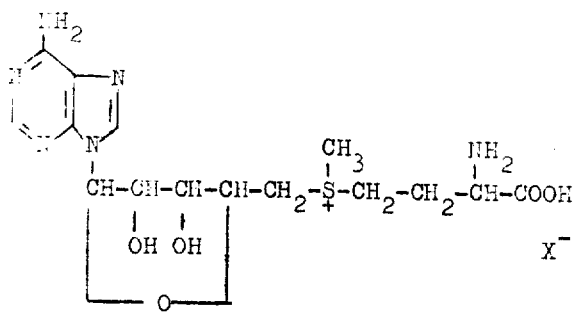

in which X is a generic anion.

In living organisms SAM is formed by the intervention of enzymes (S-adenosilmethioninsynthetasis or S-adenosiltransferasis) in the cytoplasmatic ambit starting from methionine assumed with the nutriments or from ATP present as energy reserve in every living cell.

It has also been known for some time that SAM is a product of fundamental importance in a large number of biological reactions of enzymatic transmethylation, because of which it has always been considered a very important reagent in biochemistry.

The problem with this substance has however always arisen because of its extreme weakness at ambient or above ambient temperatures.

In recent years research directed towards stabilizing SAM to an extent such as to make it possible to use it in the field of biological research has been directed towards the preparation of salts which are stable under normal temperature and humidity conditions.

In this way the chloride and sulphate of SAM have been produced, which are of use only as reagents in biochemistry for short times, because even in the dry state their stability is limited and their preparation processes can be used only for small quantity production, and certainly not for production on an industrial scale.

We have now completely unexpectedly found a new salt of SAM which is indefinitely stable with time and at ambient temperature, which can be prepared industrially with high efficiencies and economically, and which has proved to surprisingly possess strong curative power in many fields of human therapy, often without correlation between them.

The new salt according to the present invention is a salt of SAM with p-toluensulphonic acid, having the formula $SAM^+CH_3C_6H_4SO_3^-$ . $2CH_3C_6H_4SO_3H$ which hereinafter for brevity will be called $SAM.C_{21}H_{23}S_3O_9$.

The high degree of technical progress can be seen from the following table which compares the stability with time, at 25°C, in the dry state, of the two most stable salts of SAM known up to the present time, i.e. the chloride and sulphate, and the new triparatoluenesulphonate. The figures refer to the precentage of SAM residue after the times indicated:

TABLE 1

| Anion | 30 d | 180 d | 360 d | 540 d |
|---|---|---|---|---|
| Chloride | 65 | — | — | — |
| Sulphate | 91.7 | 61.0 | — | — |
| tri-p-toluene-sulphonate | 98.5 | 92.2 | 84.2 | 80.1 |

The process for preparing the new salt according to the invention comprises essentially the following stages:

a. treatment of yeast (*Saccharomyces Cerevisiae, Torulopsis utilis, Candida utilis* etc.) enriched in SAM by the addition of methionine under suitable conditions (Schlenk, Enzymologia 29, 283 (1965) with ethyl or methyl acetate at ambient temperature, so as to cause the lysis of the cells and the passage into solution of 100 percent of the SAM present.

b. absorption of the filtered aqueous solution in a column of weak cation resin in acid form.

c. removal of the impurities by washing with water and then with 25 mM acetic acid.

d. selective elution of the SAM with an aqueous solution of p-toluensulphonic acid.

e. neutralization of the excess p-toluensulphonic acid by treatment with a strong or weak anionic resin (OH⅓ form) until a molar ratio of p-toluensulphonic acid:-SAM of between 3 and 10, preferably about 6, is obtained.

f. concentration under vacuum at ambient temperature or lyophilizing of the solution until a final volume between 2 and 4 twentieths of the initial volume is obtained, preferably about 3/20.

g. addition to the concentrate of an organic solvent miscible with water (e.g. ethyl, propyl, isopropyl alcohol, acetone, methylethylketone etc.) which causes the precipitation of the salt $SAM.C_{21}H_{23}S_3O_9$, in the practically pure state.

The stage (a) of the process according to the invention is conducted using a quantity of acetate between 1/20 and 1/5, preferably 1/10, of the weight of the humid cells, and is protracted for a time between 30 minutes and 2 hours, preferably 1 hour.

It should be noted that the lysis of the yeast cells conducted with organic solvents is much more convenient in our process than that normally carried out with perchloric acid, formic acid or acetic acid at 6020 C and the like, in that it does not require high temperatures which have a negative effect on the stability of the SAM, especially under the pH conditions created by the presence of the lysant acids. Moreover the absence of strong acids in the solution enables a weak cationic resin to be used in the following stage in small volumes, and enables normal equipment to be used without the danger of corrosion.

Finally the denaturing of the proteins carried out by the organic solvent makes the cellular residues easily filterable.

Stage (b) of the process is preferably carried out using a column of weak cationic resin such as IRC-50, H⁺ form.

Stage (d) may be carried out using solutions of concentrations up to 1 molar of p-toluensulphonic acid in water.

This is of great advantage in the subsequent stage of concentration of the solution.

To neutralize the excess of p-toluensulphonic acid in stage (b), Amberlite IRA 900 or Amberlite IR 45 resins have been shown to be particularly efficient. The final p-toluensulphonic acid:SAM ratio has been found critical with regard to creating the best conditions because in the subsequent stage of precipitation of the SAM p-toluensulphonate, all the inorganic cation salts remain in solution together with the small quantities of impurities which may be present, whereas there is a quantitative precipitation of the salt. The process for preparing $SAM.C_{21}H_{23}S_3O_9$ according to the present invention has been described heretofore in its preferred embodiment, which has given the best industrial results.

Some modifications experimented by us with good results are mentioned hereinafter, whereas others will be evident to experts of the art.

It is firstly clear that the SAM tri-p-toluensulphonate may be precipitated by any aqueous solution containing SAM. This may be for example a solution originating from enzymatic synthesis or chemical synthesis of SAM, or an aqueous solution of one of its soluble salts. However in each case a less pure product with a lower yield is obtained.

A further modification of the process consists of eluting the SAM adsorbed on the weak cationic resin with an aqueous solution of hydrochloric acid or sulphuric acid instead of p-toluensulphonic acid directly.

The chloride and sulphate anions may be suitably eliminated from the eluate, for example with an anionic resin, a calculated quantity of p-toluensulphonic acid being added in the identical ratio to that described for direct precipitation, and hence precipitating the tri-p-toluensulphonate.

Alternatively a chloride or sulphate of impure SAM may be precipitated from the eluates after having partially eliminated the excess of acid either by evaporation or by treatment with a suitable base. The sulphate or chloride thus precipitated is redissolved in water, and after elimination of the anion and addition of p-toluensulphonic acid in the ratio previously described, the tri-p-toluensulphonate of SAM is precipitated.

Other strong acids may be used in a similar manner for the elution of the SAM, without however giving any particular advantages.

In the following examples we illustrate the method of preparing the new salt according to the invention, using the preferred method and some modifications, it being understood that these examples are only illustrative and are not limiting with respect to the invention.

EXAMPLE 1

To 90 kg of yeast enriched in SAm (5.5 g/kg) in accordance with Schlenk (Enzymologia 29, 283 (1965) are added 9 l of ethyl acetate at ambient temperature. After energetic agitation for one hour the mass is diluted with 40 kg of water; it is filtered and washed obtaining 140 l of solution containing 3.55 g/l of SAM, equal to 99.5% of that present in the starting material.

14 litres of this solution are absorbed on 1 litre of Amberlite IRC 50 resin, H⁺ form, and then eluted in succession: a) with water; b)with 0.025N acetic acid; c) with a 1M solution of p-toluensulphonic acid. The fractions rich in practically pure SAM (determination by chromatography on a thin layer in accordance with Anal.Biochim. 4; 16-28 (1971) ) are equal overall to 1.8 l and contain 85% of the product fed into the column.

This solution is treated with 1.7 l of Amberlite IRA 900 resin OH⁻ form.

After filtration and washing the resin with water, a solution is obtained which contians 2.2% of p-toluensulphonic acid and 0.85% of SAM.

The solution is concentrated at ambient temperature under vacuum, down to 600 ml and then acetone is added. A white powdery microcrystalline salt is precipitated, which is odourless, hygroscopic and very soluble in water (more than 25 percent) with the formation of a colourless solution. The salt is not very soluble in methanol or ethanol, and is insoluble in acetone, methylethylketone, chloroform, higher alcohols and benzene.

On analysis the salt gave the following results:
C = 46.9%; N = 5.3%; N = 9.2%; S = 13.8%

For $C_{36}H_{46}N_6O_{14}S_4$ (M.W. = 915.1) the calculated results are:
C = 47.20%; H = 5.15%; N = 9.18%; S = 14.00%

| Furthermore: | p-toluensulphonic acid | = | 55.8% |
| | SAM | = | 42.5% |
| Calculated: | p-toluensulphonic acid | = | 56.4% |
| | SAM | = | 43.6% |

Weight loss by drying for 12 hours at ambient temperature under vacuum in $P_2O_5$ : 1.5–2 percent.

Humidity determined in accordance with K. Fischer : 1.5–2 percent

The U.V. spectrum of the new compound shows an absorption maximum at 256 nm. E 15,600 (in 6N sulphuric acid); at 260 nm, E = 16,300 (at pH 7).

All these data agree with a compound of formula

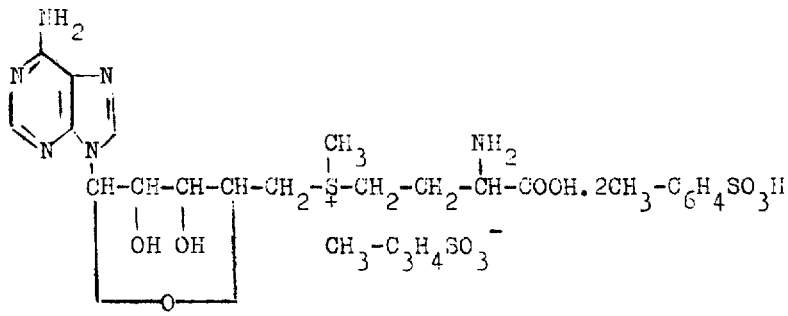

The new compound has further been identified by the enzymatic method based on the enzymatic methylation of nicotine amide or guanidine acetic acid with SAM (G.L.Cahtoni,J.Biol.Chem. 189, 745 (1951); ibid. 204, 403 (1953); G. De La Hoba, G.A. Jamieson, S.H. Mudd, H.H.Richards, J.A.C.S. 81, 3975 (1959) ).

EXAMPLE 2

9 kg of yeast are treated as in example 1, and after lysis of the cells 13.8 l of solution containing 3.60 g/l of SAM are obtained, equal to 99% of that present in the treated material. This solution is absorbed on 1 litre of IRC 50 resin $H^+$ form and eluted with water, 0.025N acetic acid and a solution of 4N HCl. The fractions rich in pure SAM, examined as in example 1, correspond to 0.8 l and contain 87% of the product fed into the column. It is evaporated to dryness at 40° under vacuum. Water is added until a solution of 5% SAM is obtained keeping the solution at 0°C, and Dowex 50 resin, form $OH^-$, is added until a sample of the solution shows the absence of chlorides.

The resin is filtered out, 110 g of p-toluensulphonic acid is added and concentrated down to 600 ml. Methyl alcohol is added until precipitation is complete. After filtration and drying the tri-p-toluensulphonate of SAM is obtained, having the same characteristics as that obtained in example 1.

EXAMPLE 3

13.8 litres of SAM solution obtained after lysis of yeast cells as described in example 2 (3.60 g/l SAM) are absorbed on 1 l of Amberlite IRC 50 resin, $H^+$ form, and eluted subsequently with water, 0.025 M acetic acid and finally with 1 N sulphuric acid.

The fractions richest in SAM (1.8 l, 86% of the product fed to the column) are treated with a suspension of $Ba(OH)_2$ at 0°C until sulphates are completely eliminated.

After filtration and washing the barium sulphate, 108 g of p-toluensulphonic acid are added and example 2 is followed, obtaining a tri-p-toluensulphonate of SAM having the same characteristics as the product obtained in example 1.

EXAMPLE 4

13.8 litres of solution containing 43.4 g of SAM are absorbed on a column of resin and eluted as in example 2 with aqueous HCl. The fractions rich in SAM are evaporated at 40° under vacuum until dry.

Water is added to give a 10% chloride solution which is precipitated by the addition of acetone. The salt thus obtained has the following characteristics on analysis:

| | |
|---|---|
| Chlorides | 16.86% |
| SAM | 78.85% |
| $H_2O$ | 4.2% |

10 g of this salt are dissolved in 200 ml of water and the chlorides are eliminated at 0° with Dowex 50 resin, form $OH^-$. To the solution are added 19.7 g of p-toluensulphonic acid, the mixture is concentrated to 80 ml under vacuum at 40° and acetone is added to precipitate the tri-p-toluensulphonate of SAM which has the same characteristics as that prepared in accordance with example 1.

EXAMPLE 5

13.8 litres of solution containing 3.60 g/l of SAM obtained as described in example 3 are absorbed on a column of IRC 50 Amberlite resin, form $H^+$.

The fractions rich in SAM are treated with $BaCO_3$ until the molar concentration of the sulphates is equal to that of the SAM. The solution is filtered and the filtrate is concentrated down to 500 ml. A salt is precipitated with acetone having the following characteristics on analysis:

| | |
|---|---|
| Sulphates | 28.2% |
| SAM | 58.9% |
| $H_2O$ | 5% |

10 g of the salt so obtained are dissolved in 120 ml of water and treated with Amberlite IRA 900 resin, form $OH^-$, until the sulphate ion is eliminated.

After the resin is filtered 14.7 g of p-toluensulphonic acid are added, the mixture is concentrated down to 60 ml and acetone is used to precipitate a p-toluensulphonate of SAM having the same characteristics as that obtained in example 1.

EXAMPLE 6

1 g of SAM iodide (600 mg of SAM) are dissolved in 10 ml of water and treated with Dowex 50 resin $OH^-$ form at 0°, until the iodide ion is eliminated.

After filtration of the resin, 1.5 g of p-toluensulphonic acid are added, the mixture is concentrated down to 6 ml and acetone is used to precipitate the tri-p-toluensulphonate of SAM having analytical characteristics identical with that obtained in example 1.

For some years it has been known from biochemical research that SAM is the only specific donor of methyls in living organisms for the biochemical reactions of transfer of the $CH_3$ group, which are fundamental reactions in the lipidic, protidic and glucidic metabolism.

By way of example we give below some of the more important SAM-dependent transmethylation reactions:

a. N-transmethylation: adenine, carnitine, carnosine, creatine, 2,6-diamonopurine, adrenaline, guanine, hordenine, N'-nicotinamide, nicotine, phosphatidilocoline, ricinine;
b. O-transmethylation: N-acetylserotonine, dopamine, epinine, d-adrenaline, l-adrenaline, cholesterol, ergosterol, l-noradrenaline, pectine, ubiquinone;
c. S-transmethylation: 2,3-dimercaptopropanol, $H_2S$, methionine, methylmercaptan, S-mercaptopropionic acid, S-mercaptoethanol, thiopyrimidine, thiouracyl;
d. C-transmethylation: cytosine, thymine.

This means, referring in particular to the human organism, that SAM acts in the following metabolic processes: biosynthesis of choline; bisoynthesis of phosphatidylcholine; activity of enzymes which require SH groups; metabolism of catecholamines; metabolism of biogene centroencephalic amines; metabolism of serotonine; metabolism of histamine; metabolism of vitamine B12 and of pholic acid; metabolism of creatine; metabolism of myosine; metabolism of histones; metabolism of RNA; metabolism of DNA; metabolism of proteic substances; metabolism of some hormones of cyclopentane perhydrophenantrenic nucleus, the main ones of which are the estrogens; metabolism of the triglycerides.

It has also been known for some time that SAM, once demethylated by the methyltransferasic enzymes, is transformed into S-adenosilhomocysteine (SAO) which is an indirect donor of hydrosulphide groups and hence has a determining importance in the metabolism of all compounds which require SH groups for carrying out their biological activity. Particularly important among these are some bioenzymes and the sulphurated amino acids.

SAO in its turn is decarboxylated in the organism, and the decarboxylated product is the principal donor of the aminopropyl group, indispensable - according to the most recent biochemical knowledge - for the biosynthesis of polyamine.

The process is catalysed by various enzymes among which a specific one is aminopropyl-transferasis.

Summarising we may say that it is known the SAM in the human organism is closely connected with all biochemical reactions of:

A—transmethylation (specific yielding of the $CH_3$ group)

B—transsulphuration (specific yieldiing of the SH group)

C—transaminopropylation (specific yielding of the aminopropyl group)

The sum of this knownledge could lead one to think that SAM could have some therapeutic action in the treatment of pathological states linked with the shortage or otherwise deficinecy conditions in the organism with respect to some of the many products mentioned above.

However the extreme instability of SAM and the lack up to the present time of any method for making it stable for sufficient times under normal ambient conditions has prevented this product from being given any pharmacological or clinical tests and hence has prevented any practical use being found for it in the field or human therapy. Only after the preparation of the new SAM salt according to the present invention (SAM-tri-p-toluensulphonate), a salt which in practice is indefinitely stable at ambient temperature, has it been possible to carry out a systematic pharmacological and clinical study which has led to the discovery for the new salt of therapeutic properties completely surprising in their quality and intensity. From the enormous quantity of pharmacological and clinical data collected for this new product, we give hereinafter only some elements sufficient to clearly indicate to experts in the art the essential characteristics of the new product and its main uses in human therapy.

TOXICITY — the tri-p-toluensulphonate of SAM according to the invention has proved absolutely free from acute toxicity, chronic toxicity, local intolerance or secondary effects.

In particular, the $DL_{50}$ in the rat and mouse is greater than 5 g/kg.

The tests of tolerability and chronic toxicity were carried out on rats of the Wistar and Sprague-Dowley stock administering for 12 months 2-10 mg/kg per day of product; at the end of the treatment the various organs and apparatus showed no pathological alteration.

The teratogenesis tests were carried out on rabbits and rats; even with the administration of massive doses of SAM-tri-p-toluensulphonate, approximately 10 times the maximum therapeutical dose, no teratogenic actions were encountered or any malformations in the embryons or terminal feti.

The addition of doses up to 0.1–0.2 mg/ml of product in surviving cultures of human lymphocytes or hepatic mouse cells does not produce any change in the blasticising index for the cellular elements.

The intravenous administration in doses up to 20 mg/kg does not produce any pyrogenic manifestation in the rabbit.

The venous administration in the rabbit and cat of 40 mg/kg does not cause any change in the carotid pressure, the cardiac and respiratory frequency or the electrocardiac trace.

The local tolerability of the intermuscular injection, even after administrations repeated over 15-20 days, and of the intravenous injection in the marginal vein of the auricular pavilion, is excellent.

In man, in young volunteer healthy subjects of both sexes subjected to administration by the rapid intravenous method or by phlebocylsis of doses of SAM-tri-p-toluenesulphonate equal to 10–500 mg (average weight 70 kg), the simultaneous examination of the minimum and maximum pressure, of the pulse and respiratory frequency at 1,5,15,20,30,60 minutes and at 2,3,6,8,10,12,24 hours from the end of administration does not show any variation from normal values.

The electrocardiagraph trace does not show any variation in the pQ interval, in the ST section, nor any appearance of extrasistol or other alterations at 30", 1',2',3', 5',10' and 20' from administration.

In the hemopoietic apparatus and in the hepatic and renal operation there were no variations which were statistically significant from normal.

PHARMACOLOGY — In order to determine indicatively and otientatively how the SAM-tri-p-toluenesulphonate is distributed in the tissues some product marked with $^{14}C$ (45 $\mu$C/millimole) in the methyl was prepared and was administered to guinea pigs, in doses of 1 $\mu$c/g in guinea pigs of 200 g.

After 15 from administration, a marked radioactivity was observed, sharply definable by histoautoradiographical techniques in the brain, in the spinal marrow, in the liver, in the lung, in the kidneys, in the suprarenals, in the thyroid, and in the gastroenteritic tract.

It was consequently deduced that the new salt easily crosses the hematoencephalic barrier and donates the $CH_3$ to the tissues provided with methyl transferasic activity. In other words the capacity of the new product according to the invention to electively localise itself in all the organs provided with methyltransforasic systems was deduced.

This was confirmed by successive pharmacological tests. A whole series of tests carried out on rats have shown that the new compound exercises a considerable protective and resolutive action of hepatic steatosis by hyperlipidic-hyperproteic diet according to Handler, in steatosis by acute alcoholic intoxication and by other toxic agents by the administration of only 10 mg/kg; both from the morphohistochemical and analytical points of view, S-adenosilmethione inhibits the accumulation of lipids at the hepatocite level.

In experimental hyperlipemia on the rat, for example by Triton S, SAM tri-p-toluenesulphonate has shown a hypolipemising activity which is very conspicuous and, in relation to the dose used, which was 10 mg/kg, considerably more intense than other substances of hypolipemising activity.

In chickens made heterosclerotic with diets rich in cholesterol and fructose, the parenteral administration of the new product in doses of 10 mg/kg reduced the cholesterolemia and favourably modified the lesions found in abdominal and thoracic aorta checks of the small vessels of the encephalic base.

With regard to the metabolism of the phospholipids, an increase was found experimentally in the amount of phosphatidylcholine in the hepatic tissues of rats in uncompensated sterosis. A distinct increment in phosphatidylcholine was also found in the α-lipoprotein hematics in the experimental alterations provoked by the β/α lipoproteic ratios.

All these tests have clearly shown a curative effect of SAM-tri-p-toluensulphonate in alterations of the lipidic metabolism.

Another series of tests conducted on the rat have shown that the administration of SAM-tri-p-toluenesulphonate in doses of 2 mg/kg induces an accumulation of the glycogenic reserves at the hepatic and muscular level, distinguishable both by histochemical techniques and by quantitative determinations. In experimental diabets by alloxane the quantity of insulin necessary to return the glycemic values to normal was considerably reduced by administrations of SAM-tri-p-toluensulphonate in quantities of 5 mg/kg.

This series of tests has shown a distinct positive action of the new compound according to the invention on the glucidic metabolism.

Finally rats with hypodisproteinemia experimentally provoked were treated with quantities of 10 mg/kg of SAM-tri-p-toluensulphonate. It was found that said product returns the values of the total proteinemia to normal, by considerably increasing the albumin quota and consequently demonstrating a high proteic anabolising activity.

This and other similar tests have demonstrated the curative power of the new product in the disfunctions of the protide metabolism.

CLINICAL TESTS

Following the indications gained from the pharmacological tests, the clinical tests were orientated on morbid affections in which the following appear primitively or secondarily altered:

1—the metabolism of the lipids
2—the metabolism of the glucids
3—the metabolism of the protids
4—the metabolism of the catecholamines and the biogene amines.

1. From tests conducted clinically on hundreds of subjects using doses of SAM-tri-p-toluensulphonate varying over a very wide interval, it was found that the new compound induces a rapid fall in the hepatic lipids in the hepatosteatosis of the most varied pathogenesis, identifiable by a bioptic examination repeated after the end of the treatment cycle, even after 60 days from the end of treatment.

The administration of the product also induces a marked fall in the high values of total cholesterolamia, of hypertriglyceridemia and normalises the altered β/α lipoproteic ratios and pre- β/β ratios in the subjects with hyperdislipidemia in the uncompensated stage.

This hypocholesterolemising and hypolipemising action is verified even in doses of about 5–10 mg and is proportional to the dose.

Parallel observations have clearly shown that the hypocholesterolemising and hypolipemising activity of the new product is manifested also in subjects who did not respond to treatment with habitual drugs used or to dietetic restrictions.

In clear arteriosclerosis with clinical manifestations of the psycho-affective sphere, with turbemnesics and secondary centroencephalics (deterioration by arteriosclerotic encephalopathia) and phenomena of cerebral hypoxia, the administration of SAM tri-p-toluensulphonate by intermuscular or, in graver cases, by intravenous injection or by slow phleboclysis, in doses between 20 and 40 mg, has shown a very favourable modification of the symptomatology. In particular, in clear hypoxydotic states the recovery of the functions related to the life of relationship was very quick and statistically significant.

In post-apoplectic syndromes a greater rapidity was found in the resolution of the clinical framework, probably linked to the antithrombotic activity developed both under laboratory and living conditions by the SAM-tri-p-toluensulphonate.

With specific regard to antithrombotic activity, research carried out under laboratory and living conditions on a large amount of clinical material (plasma rich in platelets) has clearly shown the antiplatelet aggregating activity developed by variable doses of product. Thus for example 0.8 mg of compound are sufficient to significantly inhibit the platelet aggregation induced by 40 $\mu$M of ADP. The platelet aggregation curve for 4 $\mu$M of ADP is considerably modified in the antiaggregating sense by introducing by phloboclysis 2 mg/kg.

In practice SAM-tri-p-toluensulphonate has shown a strong therapeutic activity in:

a. the prevention and treatment of vascular thrombosis (coronary or cerebral);
b. the prophylaxis of thromboses, especially in some types of surgical operations (especially gynecological and obstetric).

2. The clinical asministration to numerous subjects affected by diabetes of SAM-tri-p-toluensulphonate associated with small doses of insulin, in doses of 5–10 mg per day, by intermuscular or intravenous injection has induced a marked increase in the insulin activity and hence a reduction in the hyperglycemic values and especially a distinct saving in the insulin doses.

3. Hundreds of subjects have been clinically treated affected with: secondary hypoprotidemias and disprotidemias; persistent or aggressive hepatophathias; precyrrotic or cyrrotic states; malabsorption syndromes; protide dispersing syndromes. The administrations of doses variable between 50 and 200 mg of SAM-tri-p-toluensulphonate per day by intermuscular or intravenous injection — according to the gravity of the case — caused a statistically significant increase in the total protidemia, an increase in the albumin quota and a tendency to normalise the altered percentage ratios of the electrophoretic fractions of the serum. This proteic anabolising activity has been followed by an often very important improvement in the subjective symptomology and the general objective conditions.

4. Particularly surprising results have been obtained in clinical applications of the new enzymatic salt according to the invention, in which morbid frameworks existed which were clearly correlated with modifications in the exchange of biogene amines, for example:

a. pathological frameworks of neuropsychiatric pertinence;
b. Parkinsons disease and Parkinsonism of various eziopathogeneses;
c. Disturbances of the sleeping-waking rhythm.

With regard to point a), a vast clinical casuistry conducted by examining the clinical behaviour and tests of Hamilton and Wittenberg, has clearly shown that the administration of doses varying between 20 and 50 mg of SAL per day for a period of 20–40 days induces, excluding any other form of therapy, a significant remission of the main parameters considered pathognomic for the diagnosis of the depressive forms.

With regard to point b), relative to the treatment for Parkinsons disease and Parkinsonisms, it has been found that:

1. The administration of SAM in 10–40 mg per day by intermuscular or intravenous injection — according to the gravity of the case — in association with the habitual therapy with Levodopa, gives rise to a statistically more significant improvement in the akinesia and rigidity with respect to that which occurs in patients treated only with Levodopa. Favourable modifications are also found in the extent of the Parkinson tremor, which cannot be modified by Levodopa alone.

2. The administration of SAM-tri-p-toluensulphonate distinctly improves the Levodopa-dependent psychic disturbances, with particular regard to depressive states and psychic manifestations of irritative type.

3. The administration of SAM-tri-p-toluenesulphonate in the aforementioned doses significantly blocks the train of Levodopa side effects of the various organs and apparatus, with particular reference to nausea, vomit, inappetite, hypotension, asthemia, cephalea, hypersudoration and insomnia.

With regard to point c), i.e. disturbances of the sleeping-waking rhythm, with particular regard to insomnia, the new product according to the invention is able with a dose of 5–10 mg to considerably improve the altered sleeping-waking ratios by inducing a physiological sleep without recurrence to the use of barbiturates or other substances of cortical and centroencehalic depressive action.

From that summarised heretofore the numeous unexpected perspectives opened by the new medicine in the field of human therapy are evident. Summarising we can say that the fields of use already ascertained are: treatment of hepatopias, hyperdislipidemias, generalised or local arteriosclerosis, psychiatric manifestations of depressive type and neurological type, whereas many other fields of use still remain to be examined and ascertained.

The SAM-tri-p-toluensulphonate is preferably administered by intermuscular or intravenous injection. Some pharmaceutical compositions which have been widely experimented are given below.

| Lyophilised phials | |
|---|---|
| SAM-tri-p-toluensulphonate | 5 mg |
| SAM-tri-p-toluensulphonate | 10 mg |
| SAM-tri-p-toluensulphonate | 20 mg |
| SAM-tri-p-toluensulphonate | 30 mg |
| Intermuscular solvent phials | |

| Lyophilised phials | | | | | |
|---|---|---|---|---|---|
| For SAM-tri-p-toluensulphonate | mg | 5 | 10 | 20 | 30 |
| Anhydrous bisodium phosphate | | 8 | 16 | 32 | 48 |
| Anhydrous monosodium phosphate | | — | — | 0.7 | 1.3 |
| Lidocaine HCl | | 10 | 10 | 20 | 20 |
| Bidistilled apyrogenous water g.n.ml | | 2 | 2 | 3 | 3 |
| Venous solvent phials | | | | | |
| For SAM-tri-p-toluensulphonate | mg | 5 | 10 | 20 | 30 |
| Anhydrous bisodium phosphate | | 8 | 16 | 32 | 48 |
| Anhydrous monosodium phosphate | | 0.13 | 0.25 | 0.9 | 1.3 |
| Apyrogenous bidistilled water g.n.ml | | 2 | 2 | 3 | 3 |

Other forms of administration can be:

a. Suppositories
b. Liquids for ocular, intranasal instillation
c. Liquids for aerosol application
d. Liquids for topical use.

in which the active principle is diluted in the normal acceptable pharmaceutical vehicles (see: Silvano Casadio "Tecnologia farmaceutica" — Ed.it.Ed.Cisalpino — Milan, 1960).

In conclusion we may say that the therapeutic doses of SAM-tri-p-toluensulphonate lie between 5 and 200 mg per day, according to the particular type and gravity of the affection treated.

What we claim is

1. The tri-p-toluenesulphonate of S-adenosil-L-methionine of formula

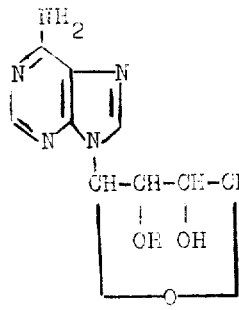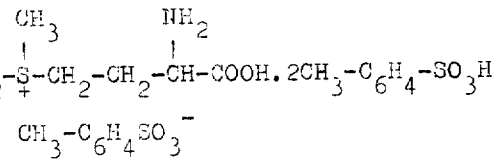

2. A process for preparing the tri-p-toluensulphonate of S-adenosil-L-methionine which comprises adding p-toluenesulphonic acid to an aqueous solution containing S-adenosil-L-methionine in a molar ratio between 3 and 10,
concentrating the aqueous solution to a small volume and
precipitating the salt by the addition of an organic solvent soluble in water.

3. A process as claimed in claim 2, in which the aqueous solution is concentrated at ambient temperature under vacuum, or is lyphilised until it reaches a volume of 2/20 to 4/20, of the initial volume.

4. A process as claimed in claim 2, in which the organic solvent soluble in water is chosen from the group consisting of methyl alcohol, ethyl alcohol, propyl alcohol, isopropyl alcohol, acetone, methylethylketone.

5. A process as claimed in claim 2, in which the aqueous solution containing S-adenosil-L-methionine originates from the lysis of cells of yeast enriched with S-adenosil-L-methionine, with ethyl or methyl acetate at ambient temperature.

6. A process as claimed in claim 5, in which the aqueous solution containing S-adenosil-L-methionine is absorbed in a column containing a weak cationic resin of acid form.

7. A process as claimed in claim 6, in which the S-adenosil-L-methionine is eluted selectively by an aqueous solution of p-toluensulphonic acid.

8. A process as claimed in claim 7, in which a prewash is carried out in a column with water and then with 0.025 N acetic acid.

9. A process as claimed in claim 7, in which the excess of p-toluenesulphonic acid is neutralised with a strong or weak anionic resin until a molar ratio of acid to S-adenosil-L-methionine of between 3 and 10, is obtained.

10. A process as claimed in claim 6, in which the S-adenosil-L-methionine is eluted selectively by an aqueous solution of strong acid, preferably hydrochloric or sulphuric acid.

11. A process as claimed in claim 10, in which the eluate is neutralised with an anionic resin of hydroxide form and with a suitable base, filtered and then treated with p-toluenesulphonic acid of a quantity such as to give a molar ratio of acid to S-adenosil-methionine of between 3 and 10.

12. A process as claimed in claim 10, in which the chloride or sulphate of S-adenosil-L-methionine is precipitated from the eluate, this salt is dissolved in water and the aqueous solution is treated with p-toluenesulphonic acid of such a quantity as to give a molar ratio of acid to S-adenosil-L-methionine of between 3 and 10.

13. The process of claim 2 wherein the molar ratio of p-toluenesulphonic acid to S-adenosil-L-methionine is 6.

14. The process of claim 3 in which the aqueous solution is concentrated at ambient temperature under vacuum, or is lyphilized until it reaches a volume of 3/20 of the initial volume.

15. A process as claimed in claim 9 in which the excess of p-toluenesulphonic acid is neutralized with a strong or weak anionic resin until a molar volume of acid to S-adenosil-L-methionine of 6 is obtained.

16. A process as claimed in claim 10 in which the S-adenosil-L-methionine is eluted selectively by an aqueous solution of hydrochloric or sulphuric acid.

17. The process of claim 11 wherein the molar ratio of acid to S-adenosil-L-methionine is 6.

18. A process as claimed in claim 12 wherein the molar ratio of acid to S-adenosil-L-methionine is 6.

* * * * *